_United States Patent Office_ 3,149,080
Patented Sept. 15, 1964

3,149,080
BIS(ARENE)CHROMIUM-ALUMINUM ALKYL
POLYMERIZATION CATALYSTS
Earl W. Gluesenkamp and William R. Richard, Jr., Dayton, Ohio, and John F. K. Wilshire, Kinghorn, Fife, Scotland, assignors to Monsanto Company, a corporation of Delaware
No Drawing. Filed Mar. 3, 1958, Ser. No. 718,413
3 Claims. (Cl. 252—431)

The present invention is directed to novel polymerization catalysts and their use in the polymerization of olefinic materials.

The novel catalysts comprise in combination bis-(arene)metal complexes and metallo organic or metallic hydride reducing agents.

It has heretofore been known to polymerize ethylene in the presence of certain catalysts, commonly designated as Ziegler catalysts, in which a Group IV to VI metal compound in which the metal is present in a positive valence state is admixed with certain reducing compounds as exemplified by trialkyl aluminum compounds or dialkyl aluminum hydrides. The presently disclosed catalysts differ radically from such Ziegler catalysts and involve an entirely different concept in that the metal in the bis-(arene)metal complex has an ionic valence of zero or may be quickly reduced to such zero valence state upon admixture with reducing agent, the said metal being held in the complex by a π-complex type of bonding.

It is an object of the present invention to prepare and utilize catalysts for the low-pressure polymerization of ethylene which are soluble, at least in part, in common hydrocarbon solvents which are utilized as polymerization media. It is a further special object to provide polymerization catalysts which are free from halides and similar anions which have a tendency to contaminate polymeric products.

The bis(arene)metal complexes which are soluble in hydrocarbon solvents and constitute one of the components (or precursors) of the catalysts of the present invention can be represented by the following "sandwich" structure, in which Tr represents a transition metal and in which benzene rings are exemplary of arene groups:

Tr°

The transition metal is attached to the benzene rings by non-localized covalent bonds and is essentially in a zero valence state. The bis(arene)metal complexes can also be employed in the form of their salts, e.g., $(C_6H_6)_2Tr^+Cl^-$, but the use of this form is undesirable, particularly in that it defeats one of the objects of the invention which is to avoid the presence of halides or other contaminating anions in the polymerization mixture. The bis(arene)-metal complexes of any of the transition metals which form such complexes can be employed in the catalysts of the present invention. As examples of such metals may be mentioned iron, chromium, molybdenum, tungsten, etc.; the metals of Group VI-B, particularly those of atomic number up to 74, are preferred; and the metal chromium is especially preferred. As the arene groups, almost any compounds containing aromatic unsaturation are suitable, so long as they do not contain substituents which interfere unduly. As examples of such groups may be mentioned benzene, toluene, naphthalene, anthracene, mesitylene, diphenyl, tetralin, phenanthrene, ethylbenzene, butylbenzene, isobutylbenzene, sec-butylbenzene, t-butylbenzene, hexylbenzene, etc. Other substituted arene compounds are also suitable, particularly those which are still essentially hydrocarbon in character, for example, fluorobenzene. It is generally convenient to utilize monocyclic arene compounds, i.e., benzenes. Those arene compounds containing no substituents other than lower alkyl groups, for example, alkyl groups of up to 6 carbon atoms, are very suitable, particularly such monocyclic arene compounds. As examples of applicable bis(arene)metal complexes, the following may be mentioned: bis(benzene)chromium, bis(toluene)chromium, bis(mesitylene)chromium, bis(tetralin)chromium, bis-(diphenyl)chromium, bis(benzene)molybdenum, bis(diphenyl)molybdenum, bis(mesitylene)molybdenum, bis-(benzene)tungsten, bis(mesitylene)tungsten, bis(benzene)iron, bis(toluene)iron, bis(o-,m-,p-xylene)iron, bis-(mesitylene)iron, bis(durene)iron, bis(hexamethylbenzene)iron, etc. The type of bis(arene)metal complexes contemplated as useful herein and methods of preparation thereof have heretofore been disclosed, for example, by Tsutsui and Zeiss, Naturwissenschaften, 44, Heft 15, S. 420 (1957); Fischer and Kögler, Ber., 90, 250 (1957); and in the copending application of Harold H. Zeiss, S.N. 616,224.

While it is distinctly advantageous to utilize the bis-(arene)metal complexes in the form in which the metal has an ionic valence of zero in preparing catalysts according to the present invention, it is also possible to utilize such complexes in the form of their salts with various anions. Thus, any of the bis(arene)metal complexes given by way of example above can be employed in the form of their salts, usually their monovalent salts, for admixture with the reducing component to form the catalyst; the salts can contain such anions, for example, as chloride, bromide, iodide, fluoride, etc.; anions of organic acids, such as acetate, propionate, benzoate, picrate, etc.; anions of inorganic acids, such as sulfates, nitrate, phosphates, etc.; alkoxides, such as methoxide, ethoxide, isopropoxide, butoxide, etc.

The catalyst component having reducing properties can be defined as comprising metals or metal compounds of the 1st to 3rd groups of the periodic chart of the elements. A preferred group of such components are the organic compounds of metals having the general formula $R_nM_eX$ in which R is hydrocarbon, $M_e$ is a 1st to 3rd group metal, X is hydrogen or hydrocarbon, and n is a whole number which is lower by 1 than the valence of the metal $M_e$. In the formula, X can also be halogen although it is desirable to avoid halogen for reasons of product purity.

A particular group of organic compounds of metals which can be employed along with the bis(arene)metal complexes are aluminum compounds of the general formula $RAlX_2$, where R is hydrogen or hydrocarbon, and X means any other substituent including hydrogen or hydrocarbon; such compounds include particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxyl compounds. However, here, as above, it is advantageous to avoid use of halogen. By way of example but not limitation, the following such aluminum compounds are mentioned.

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-($\beta$-phenylethyl)aluminum
Diethylaluminum chloride
Diisobutylaluminum chloride
Diisobutylaluminum iodide
Di($\beta$-cyclohexylpropyl)isobutylaluminum In one particular aspect, the present invention concerns catalysts comprising bis(arene)metal complexes with trialkylaluminum compounds or dialkylaluminum hydrides. The use of these particular aluminum components, in addition to other advantages, avoids the presence of halogens or similar materials which would contaminate the polymeric products.

Instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these, of course, being admixed with bis(arene)metal complexes. It is also possible to employ the bis(arene)metal complexes together with alkali metal alkyls, for example, with lithium-, sodium-, or potassium methyl, -ethyl, -benzyl, -isobutyl, etc.

The present invention also contemplates catalysts useful in the polymerization of ethylene which are formed by treating bis(arene)metal complexes with reducing agents such as: alkali metals, e.g., lithium, sodium, potassium, alkali hydrides, e.g., lithium hydride, sodium hydride; complex alkali aluminum and alkali boron hydrides, e.g., lithium aluminum hydride.

In general, the reducing components (or precursors) in the present catalysts can be any of the reducing materials which are used in preparing the type of catalysts known as Ziegler catalysts.

It will be realized that reference herein to catalyst components as "reducing components" or as "reducing agents" does not require that such components act to reduce other catalyst components—and, in fact, they apparently form a complex with same—but rather indicates that a certain class of known materials is contemplated.

Despite the broad scope of the reducing components utilizable in combination with the bis(arene) complexes of transition metals in the present catalysts, it will be found more convenient in most of the present application to discuss the invention with specific reference to preferred embodiments and, therefore, trialkylaluminum will be referred to especially by way of example. Likewise, bis(arene)chromium complexes will be referred to especially by way of example of bis(arene) transition metal complexes.

The mole ratio of trialkylaluminum to bis(arene)metal complex, or stated another and simpler way, the mole ratio of aluminum (Al) to transition metal (Tr), can vary over a wide range, suitable values being, for example, 0.5:1 to 5:1 on up to 10:1 or higher. It is often preferred to use an Al:Tr mole ratio of from about 1:1 to about 3:1. These ratios are applicable, for example, to the Al/Cr ratio in general, and, by way of specific example, to the Al/Cr ratio in the catalyst, (isobutyl)$_3$Al·($C_6H_6$)Cr The catalysts of the present invention can be employed to catalyze a wide variety of chemical reactions. However, the reaction of the most commercial interest at the present time is polymerization, and insofar as polymerization is concerned, the present invention contemplates the polymerization of any monomers, the polymerization of which is catalyzed by heterogeneous metal catalysts which are capable of catalyzing the low-pressure polymerization of ethylene; the $\alpha$-olefins are particularly suitable monomers for polymerization.

At the present time, ethylene is the preferred monomer for use in the polymerization of the present invention. The resulting polyethylene ordinarily has a molecular weight of at least 2000 and generally greater than 10,000. The present invention is particularly advantageous in the preparation of polyethylenes of molecular weights ranging from 20,000 to 50,000 or 100,000 and in many cases as high as 1,000,000 to 3,000,000 or more. The molecular weights in question are those calculated in the conventional manner on the basis of the viscosity of the polymer in solution as described in the Journal für Practische Chemie, 2nd Series, vol. 158, page 136 (1941) and the Journal of the American Chemical Society, 73, page 1901 (1951). The ethylene can be homopolymerized or can be copolymerized with varying amounts, particularly on the order of 2 to 10 percent, of higher olefins such as propylene, or butylene, especially the former. Other ethylenically unsaturated hydrocarbons can be polymerized by the agency of the catalysts of the present invention, including propylene, butylenes, especially butene-1, amylenes and the like; substituted olefins, such as vinylcyclohexene, styrene, vinylnaphthalene, vinyl aromatic hydrocarbons generally, etc. In addition, a variety of copolymers of the various foregoing monomers named above with each other and with other comonomers can be polymerized according to the present invention.

The amount of catalyst required is dependent on the other variables of the particular reaction, such as polymerization; and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.001:1 and much lower values such as 0.0001:1 can sometimes be used.

The polymerization can be effected over a wide range of temperatures, again the particular preferred temperature being chosen in accordance with the monomer, pressure, particular catalyst and other reaction variables. For many monomers from room temperature down to say —40° C. and even lower are suitable, and in many cases, it is preferred that the temperature be maintained at below about 35° C. However, for other monomers, particularly ethylene, higher temperatures appear to be optimum, say from 50 to 125° C. for ethylene, particularly 95 to 115° C. Temperatures ranging up to 150° C. and higher are generally satisfactory for Ziegler-type polymerization.

The pressure at which the polymerization is carried out is dependent upon the chosen monomer or monomers, as well as other variables. In most instances, the polymerization is suitably carried out at atmospheric pressure or higher. Subatmospheric pressures are permissible. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate; and, in some instances, on polymer quality. The choice of whether or not to use an appreciably elevated pressure will be one of economic and practical considerations, taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from excessive contact with such materials. An excess of the aluminum compound tends to give a certain amount of protection against these poisons.

The catalyst of the present invention can be prepared in the vessel in which the catalyzed reaction is to be carried out, or it can be prepared in one vessel and then transferred to the intended reaction vessel, and in either event, can either be used immediately after preparation or after a period of time elapses between the preparation of the catalyst and its subsequent use to catalyze, e.g., polymerization.

The catalyst can be prepared by simply adding the bis-(arene)chromium complex to the aluminum compound, or vice versa, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied ethane, propane, isobutane, normal butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of a monomer; for example, if the catalyst is prepared in the presence of liquid ethylene and then used to polymerize ethylene, a high yield of polyethylene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers, but are nonsolvents for many of the polymers, e.g., polyethylene, can also properly be termed inert liquid diluents or inert organic liquids.

The polymer can be recovered from the reaction mixture by a wide variety of procedures, chosen in accordance with the properties of the particular monomer. It is usually desirable to remove as much catalyst from it as possible—which is not especially difficult with the catalysts of the present invention, as removal of catalyst residues is easily accomplished with acid; the reaction mixture, or the polymer after separation therefrom, is contacted with hydrochloric acid solution; or can be contacted with aliphatic alcohols, such as methanol, isobutanol, secondary butanol, etc. If the polymer is insoluble in the solvent, it can be separated by filtration, etc.; if the polymer is soluble, it can be precipitated by admixture of the solution with non-solvents, etc.

The following examples illustrate certain embodiments of the present invention.

Example 1

To a polymerization vessel containing 50 cc. kerosene, 0.64 gram bis(benzene)chromium (3 millimoles) and 0.60 gram aluminum triisobutyl (3 millimoles) were added. The vessel was then charged to 1200 p.s.i. ethylene and heated and shaken at 105° C. for 16 hours. The pressure dropped to 400 p.s.i. during this time. The greenish-white chunks of polyethylene obtained were stirred in a hydrochloric acid-acetone solution. The fine particles of polyethylene thus obtained were treated with 5% hydrochloric acid (containing a little acetone). The polyethylene was filtered from the liquid, washed three times with water, twice with acetone, and once with pentane. The dried polyethylene weighed 8.75 grams, for a production of 14 grams polyethylene/gram bis(benzene)chromium employed in the catalyst.

Example 2

A catalyst solution of 0.31 gram bis(benzene)chromium and 0.30 gram aluminum triisobutyl in 50 cc. kerosene was prepared. The catalyst was then used to polymerize ethylene at 100° C. and an initial pressure of 600 p.s.i. The pressure had dropped to zero after 16 hours. The yellow solid polyethylene obtained was filtered from liquid and pulverized in a Waring Blendor in an acetone-hydrochloric acid mixture. The resulting powder was boiled with acetone and 50% hydrochloric acid to give fluffy, white powder which was then washed successively with water, acetone and pentane. The polyethylene powder, after being dried, weighed 9 grams, or 29 grams polymer/gram of bis(benzene)chromium employed.

Example 3

In a polymerization vessel, 0.31 gram (1.48 millimoles) of bis(benzene)Cr° and 0.88 gram (4.4 millimoles) of Al(isobutyl)$_3$ were mixed in 25 cc. of kerosene. Ethylene was then admitted (after the usual precautions to remove air from the vessel) to a pressure of 720 p.s.i., and the vessel was heated at 100° C. for 18 hours. Solid polyethylene polymer was obtained, which, after separation from the reaction mixture, weighed 3.3 grams. The amount of polyethylene produced was 10 grams/gram bis(benzene)chromium in the catalyst.

Pressures, such as from 100 p.s.i. to 2000 p.s.i. can conveniently be employed in the present invention, but other pressures from atmospheric up to many thousands of pounds per square inch are also applicable.

The polyethylenes produced by the above procedures have densities of from 0.9444 to 0.047 and are comparable to low-pressure Ziegler-catalyzed polyethylenes in properties such as viscosity, tensile strength and modulus of elasticity.

While the invention has been described with particular reference to preferred embodiments thereof, it will be appreciated that variations from the details given herein can be effected without departing from the invention in its broadest aspects.

What is claimed is:
1. A catalyst consisting essentially of bis(arene)chromium and an aluminum compound selected from the group consisting of trialkyl aluminums and dialkyl aluminumhydrides in which the mole ratio of Al/Cr is from 0.5 to 5 and the arene group is a monocyclic aromatic hydrocarbon compound.
2. A catalyst consisting essentially of $(C_6H_6)_2Cr°$ and trialkylaluminum in which the mole ratio of Al/Cr is from 0.5 to 5.
3. A catalyst consisting essentially of $(C_6H_6)_2Cr°$ and (isobutyl)$_3$Al in which the mole ratio of Al/Cr is from 0.5 to 5.

(References on following page)

References Cited in the file of this patent

UNITED STATES PATENTS

| | | |
|---|---|---|
| 2,619,458 | McBride | Nov. 25, 1952 |
| 2,736,700 | Graham et al. | Feb. 28, 1956 |
| 2,786,035 | Freimiller | Mar. 19, 1957 |
| 2,822,357 | Brebner et al. | Feb. 4, 1958 |
| 2,824,145 | McCall et al. | Feb. 18, 1958 |
| 2,827,446 | Breslow | Mar. 18, 1958 |
| 2,843,577 | Friedlander et al. | July 5, 1958 |
| 2,939,845 | Stamatoff | June 7, 1960 |
| 2,952,670 | Fischer | Sept. 13, 1960 |
| 3,033,878 | Zeiss et al. | May 8, 1962 |

FOREIGN PATENTS

| | | |
|---|---|---|
| 218,210 | Australia | Nov. 3, 1958 |